United States Patent [19]

Schröder-Brumloop et al.

[11] Patent Number: 5,587,565
[45] Date of Patent: Dec. 24, 1996

[54] METHOD FOR CONTROLLING ELEVATOR DOORS

[75] Inventors: Helmut Schröder-Brumloop; Rüdiger Löb, both of Berlin, Germany

[73] Assignee: Otis Elevator Company, Farmington, Conn.

[21] Appl. No.: 227,435

[22] Filed: Apr. 14, 1994

[51] Int. Cl.$^6$ ................................................. B66B 13/14
[52] U.S. Cl. ............................................ 187/316; 187/394
[58] Field of Search .............................. 187/316, 391, 187/394; 49/120, 118

[56] References Cited

U.S. PATENT DOCUMENTS

| | | | |
|---|---|---|---|
| 4,305,481 | 12/1981 | Hmelovsky et al. | 187/316 |
| 4,832,158 | 5/1989 | Farrar et al. | 187/103 |
| 4,984,660 | 1/1991 | Ikejima et al. | 187/134 |
| 5,131,506 | 7/1992 | Mizuno et al. | 187/103 |
| 5,157,228 | 10/1992 | Ackermann et al. | 187/112 |
| 5,196,656 | 3/1993 | Mizuno et al. | 187/103 |
| 5,274,312 | 12/1993 | Gerstenkorn | 318/617 |
| 5,378,861 | 1/1995 | Barten et al. | 187/316 |
| 5,389,864 | 2/1995 | Tyran et al. | 318/562 |

FOREIGN PATENT DOCUMENTS

| | | |
|---|---|---|
| 499884 | 8/1992 | European Pat. Off. . |
| 502773A2 | 9/1992 | European Pat. Off. . |
| 0548505 | 6/1993 | European Pat. Off. . |
| 548505A1 | 6/1993 | European Pat. Off. . |
| 9307326 | 7/1993 | Germany . |

*Primary Examiner*—Peter S. Wong
*Assistant Examiner*—Robert Nappi

[57] ABSTRACT

An apparatus for controlling an elevator door includes a three phase AC motor that receives control signals from a controller. The signals are issued at control points along a speed versus distance profile map that represents the control points as a percentage of the total distance to be travelled by the elevator. The total distance of door travel in one direction is measured be counting the number of pulses generated by an incremental encoder during a training run wherein the door is moved between its extreme positions at a constant speed. The number of pulses counted is then normalized to represent 100% of the distance traveled. During operation, the pulses are counted whenever the elevator door is in motion and control signals are issued based upon the number of pulses counted.

3 Claims, 3 Drawing Sheets

METHOD FOR CONTROLLING ELEVATOR DOORS

BACKGROUND OF THE INVENTION

1. Field of the Invention

The present invention generally relates to an apparatus and method for controlling elevator doors and, in particular, relates to one such apparatus including an incremental encoder for determining the position of the elevator door.

2. Description of the Prior Art

Conventional elevator door control systems are primarily mechanical in nature. Typically, elevator doors require different motor speeds during the opening and closing thereof. That is, an elevator door, because of its mass and in order to ensure passenger safety, requires a relatively slow motor rotation but high torque motor force at the beginning of its run. Once moving, however, the motor force requires less torque but higher speed to accelerate the door until the elevator door has travelled about three quarters of its full distance. Thereafter, the elevator door needs to be slowed prior to reaching the end of its run. This speed/torque trade-off for the motor according to the movement and position of the door is generally referred to as the door profile.

The door profile, in many modern elevators, is controlled or regulated by the use of mechanical switches, for example, located on cams or drive shafts. The switches, or relays, are adjusted to control the motor depending upon the path position of the door. Further, the transmission between the motor shaft and the door was typically accomplished by use of a sinusoidal drive linkage because of the difficulty in controlling the motor to start at a low speed, accelerate and decelerate according to the door position. As a result, not only are such systems subject to the wear and contamination of the relays but subject to wear and slippage of the linkages as well.

A further drawback of such mechanical systems is that fact that reversals are difficult to achieve. As well known in the elevator art, a reversal of an elevator door generally refers to a situation where the door encounters an obstruction in the path of the door while in motion, such as a passenger entering or leaving the elevator while the door is in motion. One reason for such difficulties in reversals in the conventional mechanical systems is that the drive transmissions are typically implemented via sinusoidal linkages and thus there is a continuously changing mechanical reduction factor.

A further drawback of conventional systems is that, at the time of installation of the elevator, all of the various mechanical components must be adjusted to ensure the proper opening and closing of the elevator door. This usually requires trained personnel and specialized tools.

Consequently, it is highly desirable to provide an apparatus and method for controlling an elevator door that not only overcomes the mechanical difficulties of conventional elevator door but is also more efficient and less expensive.

DISCLOSURE OF THE INVENTION

Accordingly, it is one object of the present invention to provide an apparatus and method for controlling elevator doors that substantially overcomes the above-recited drawbacks of conventional elevator door systems.

This object is accomplished, at least in part, by an apparatus and method for controlling elevator doors including an incremental encoder for determining the position of the elevator door.

In one aspect of the present invention the number of pulses generated by an incremental encoder during a full path run is normalized to be equivalent to 100% of the distance travelled. Thereafter, a door profile, having motor control points whereat the speed and torque of the motor are changed, is executed. The motor control points along the path of travel of the elevator door are characterized by the percentage of the total path distance. Thus, by counting the pulses generated when the elevator door is in motion, the controller can electronically provide control signals to the elevator motor when the elevator door reaches the preselected locations along the path thereof. Hence, the motor speed and torque are electronically controlled at the motor control points.

In another aspect of the invention, the elevator door controller is electronically "trained" by learning runs. During a first learning run the door is moved from one extreme position to the other extreme position, i.e., the door is opened or closed, to determine the direction control information to be stored in the controller. A second learning run causes the door to move the full travel distance at a preselected constant speed. During the second learning run, the total number of pulses generated by an incremental encoder is counted to thereby determine a reference speed as well as the number of pulses representing a normalized 100% travel distance. From the information gathered via the learning runs the controller can thereafter regulate the motor in accordance with the desired door profile by counting the pulses generated when the car is in motion.

Other objects and advantages will become apparent to those skilled in the art from the following detailed description read in conjunction with the appended claims and the drawings attached hereto.

DESCRIPTION OF THE DRAWINGS

The drawings, not drawn to scale, include.

BEST MODE FOR CARRYING OUT THE INVENTION

Figure 1:
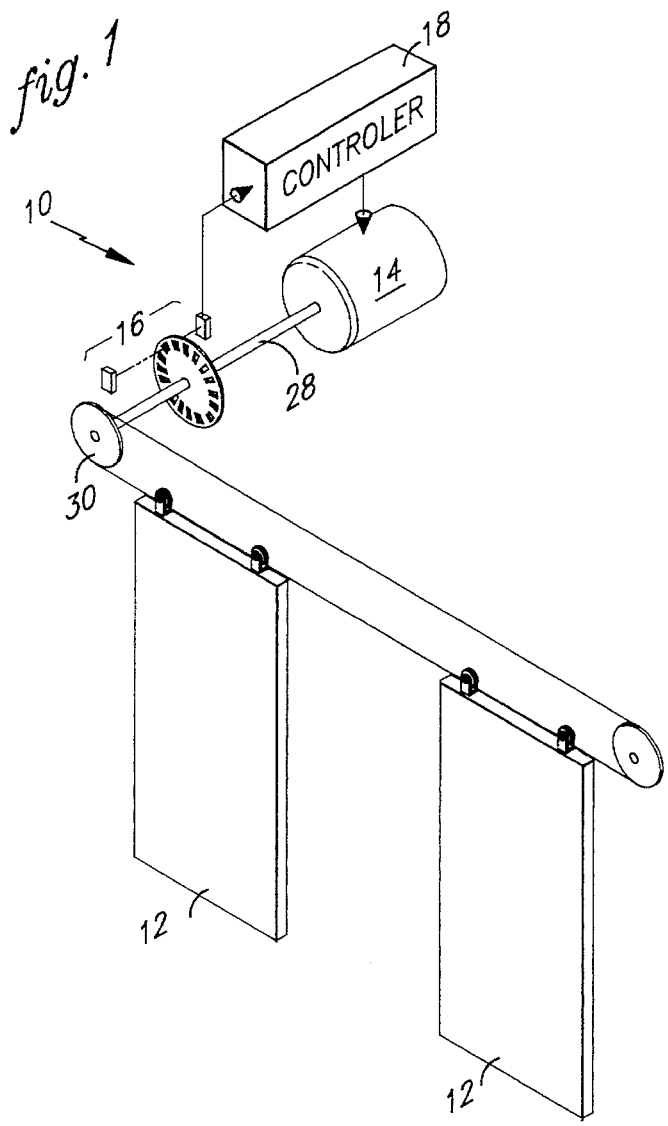
FIG. 1 which is a diagram of an apparatus for controlling an elevator door embodying the principles of the present invention.

An apparatus, generally indicated at 10 in FIG. 1 and embodying the principles of the present invention, for controlling an elevator door 12 includes means 14 for moving an elevator door 12, means 16 for generating pulses when the elevator door 12 is in motion, and means 18 for controlling the elevator door moving means 14 in accordance with the pulses generated. Preferably, the controlling means 18 includes means 20 for counting the generated pulses when the elevator door 12 is in motion and means 22 for comparing the counted pulses to a stored elevator door profile map 24 relating the position of the elevator door 12 with the number of pulses counted.

In the preferred embodiment, the means 14 for moving the elevator door includes a motor 26 having a drive shaft 28. The drive shaft 28 is connected to the elevator door 12 by means 30 for converting the rotational motion of the drive shaft 28 to the linear motion of the elevator door 12. For example, the drive shaft 28 could be connected to the elevator door 12 by a pulley driving a set of linkage arms. Alternatively, the drive shaft 28 may be connected to a pulley that drives a belt drive connected to the elevator door 12. In any case, the relationship between the rotation of the drive shaft 28 and the linear distance travelled by the elevator door 12 is known. This transmission ratio is thus a known factor regardless of whether the elevator door 12 is a double door system or a single door system. Such rotational motion to linear motion conversion systems are quite well known in the art and further detailed discussion is not believed necessary herein for a full understanding of the present invention.

Preferably, the motor 26 is a three phase AC motor that, as more fully discussed below, receives control signals from the control means 18. One reason for selecting a three phase AC motor is that the electromechanical relationships thereof are well known. For example, the frequency corresponds to the speed of rotation of the drive shaft 28, the voltage corresponds to the torque of the motor 26 and the phase is related to the direction of rotation of the drive shaft 28. Hence, by controlling the frequency, voltage and phase of the motor 26 the speed, torque and direction thereof can be controlled. Although a three phase AC motor is preferred, other types of motors, including DC motors, can also be used in conjunction with the present invention.

Figure 2:
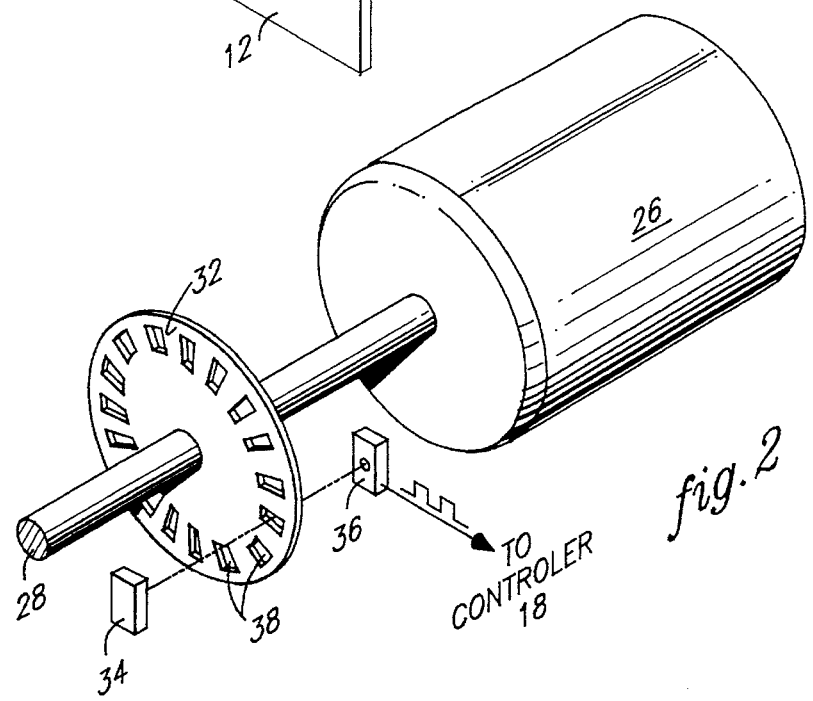
FIG. 2 which is a schematic diagram of an incremental encoder particularly useful in the apparatus shown in FIG. 1.

As shown in FIG. 2, the means 16 for generating pulses when the elevator door 12 is in motion includes an encoder disk 32 rigidly mounted on the drive shaft 28 of the motor 26. In the preferred embodiment, the means 16 also includes a light source 34 disposed on one side on the encoder disk 32 and a light receiver 36 disposed on the opposite side of the encoder disk 32. The encoder disk 32, in such an embodiment, includes a plurality of regularly spaced openings 38 about the periphery thereof. In operation, when the drive shaft 28 rotates, the encoder disk 32 acts as a light chopper to provide a stream of light pulses to the light receiver 36. In response to each light pulse striking the light receiver 36, the light receiver 36 generates an electrical output signal. As shown, the electrical signals so generated are outputted to the means 18 for controlling the elevator door moving means 14.

The means 18 for controlling the elevator door moving means 14, in this embodiment, the three phase AC motor 26, includes the means 20 for counting pulses and the means 22 for comparing the counted pulses, as a percentage of the total number of pulses for full door travel in one direction, to the profile map 24. In addition, in the preferred embodiment, the means 18 includes a microprocessor 40 and an associated memory 42 wherein the preselected profile map 24 is stored. Further, the memory 42 is also provided with the relevant motor characteristics, such as the voltage/torque ratio, the frequency/speed ratio and the phase/direction information. The controller 18 further includes voltage, frequency and phase output signals 43 for controlling the torque, speed and direction, respectively, of the motor 26.

Figure 3:
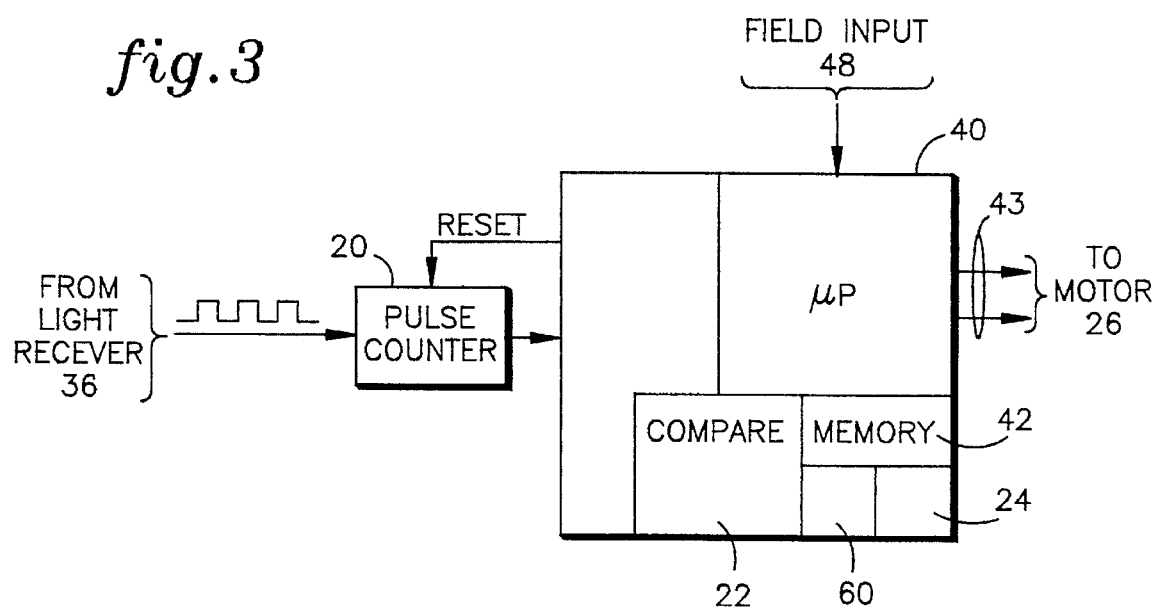
FIG. 3 which is a block diagram of a controller particularly useful in conjunction with the apparatus shown in FIG. 1.
Figure 4:
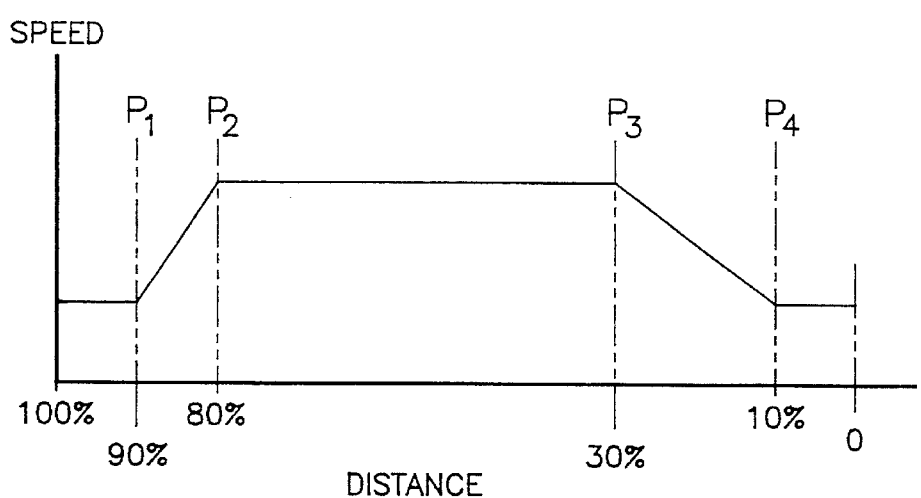
FIG. 4 which is a representative elevator door profile.

In operation, the controller means 18, as more fully discussed below, is initialized so that the profile map 24 represented in the memory 42 is executed each time the elevator door 12 is opened or closed. A typical profile map 24 is shown in FIG. 4. As shown therein, the distance travelled by the door is shown on a scale of percentage movement with the full travel of the door 12 being 100%. The motor switching points, i.e., from high torque to high speed or high speed to high torque, are located at predetermined points along the door path. In the example shown in FIG. 4, the distance travelled by the door 12 is plotted along the horizontal axis with the vertical axis representing the speed of the door 12 during the travel. For discussion purposes only, the profile shown in FIG. 4 will be taken to represent a fully opened door at the extreme right of the profile. When a signal to close the door is received the door begins to move at a very slow speed, i.e., a creeping speed. The door 12 continues to move at this speed for between about 0% to about 10% of the total distance to be traveled. Thereafter, the speed is ramped up to a closing speed, typically the ramping occurs over about the next 10% of the total distance to be travelled by the door 12. Once the closing speed is reached the door 12 continues to move at that speed for about the next 50% of the total distance to be travelled by the door 12. When the door 12 has travelled about 70% of the total distance the speed of the motor 26 is reduced to a preselected closing speed over the next 20% of the total distance travelled. Thereafter, the door 12 continues at that closing speed until a mechanical stop is reached. The speed versus distance profile can, in essence, be reversed in order to open the elevator door 12. In fact, it will be recognized that the speed change points as well as the actual speeds can be varied to suit any door or generate any profile desired. For example, the profile can be adjusted for either a single door or a double door, the profile can be adjusted to accommodate any desired motor as well as to accommodate various gear systems. Advantageously, by being able to make such adjustments, the present apparatus 10 for controlling the elevator door 12 is applicable and adaptable for use with any elevator door system. In the preferred embodiment, the motor control points along the profile are flagged or indicated to the microprocessor 40 by the means 22 for comparing the number of pulses counted with the stored profile map so that the position of the door is always "known" to the microprocessor 40. Although the means 22 is represented as a "hardware" block in FIG. 3, it is to be understood that it can be a software routine that continuously monitors, or counts the pulse counts generated by the light receiver 36.

As mentioned above, one of the drawbacks of current elevator door systems is the need for initial adjustment of all the mechanical component thereof. In addition, as the system ages and wear occurs, such a system is subject to misalignment and slippage. Consequently, to avoid such misalignments and slippage, conventional elevator door systems require regular maintenance checks are readjustments. However, the present apparatus 10 requires a single initialization, described in more detail hereinbelow, and, in fact, can monitor the alignment of the mechanical system.

Figure 5:
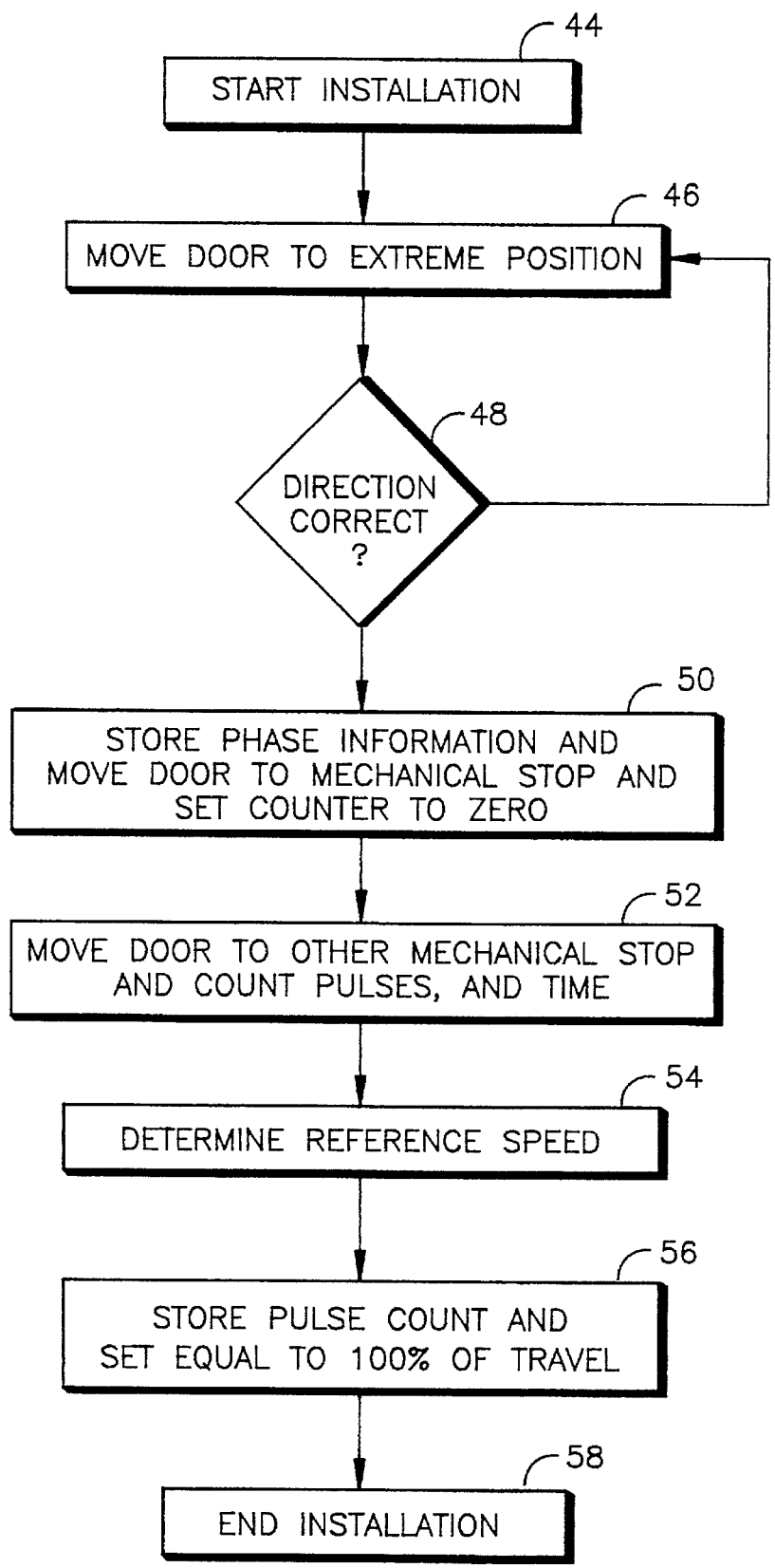
FIG. 5 which is a flow chart of a method of controlling an elevator door embodying the principles of the present invention.

Once, initialized, the means 18 for controlling the motor 26 can thus control the movement of the elevator door 12 in accordance with the number of pulses counted. This initialization is accomplished, in the preferred embodiment, in accordance with the exemplary flow diagram shown in FIG. 5. It will be understood that the initialization is controlled by a software program stored in the memory 42 of the microprocessor 40. As shown in FIG. 5, at the time of installation, indicated by block 44, the elevator door 12 is moved, at block 46, from one extreme position to the other extreme position, i.e., the elevator door 12 is either opened or closed.

The field personal is then prompted by the microprocessor 40 to input, at block 48, the direction of door movement.

If the elevator door moved in the incorrect direction the input causes the direction, i.e., the phase of the motor 26, to be electronically changed and the movement of the elevator door 12 is repeated.

If the direction moved was correct, the phase/direction information is stored in the memory 42. Thereafter, the controller 18, based upon the phase/direction information stored, will always be able to control the direction of door movement. This is particularly critical during reversals so that when an object is sensed, for example by a sudden decrease in pulses generated by the light receiver 36 or by a conventional mechanical sensor, in the path of the elevator door 12, the direction of door movement can be reversed quickly by the microprocessor 40.

Once the phase/direction information is stored, the field personal is prompted to initiate a second learning run. The elevator door 12 is then driven to a mechanical stop, i.e., either fully opened or fully closed, indicated at block 50. When the mechanical stop is reached the pulse counter 20 is set to zero by the microprocessor 40.

The elevator door 12, as indicated at block 52, is then driven to the opposite mechanical stop, i.e., fully closed or fully opened, respectively, at a predetermined constant speed. During this movement the number of pulses are counted and the time measured for completion of the distance travelled. As a result, as shown at block 54, a reference speed is determined in relation to the number of pulses counted. Further, as shown at block 56, the total number of pulses occurring during the travel between mechanical stops are also counted and stored. The installation is then completed, as indicated at block 58.

For control purposes, the total number of pulses counted is then set to represent 100% of the distance travelled by the door 12 during one direction. The 100% normalization is then used to control the motor 26 in accordance with the profile map 24. As shown in FIG. 5, and as discussed above, the profile for the elevator door 12 includes a plurality of control points along the path of the door 12 whereat motor commands are outputted by the controller 18 to conform the action of the motor 26 to that of the profile.

Advantageously, the microprocessor 40 in conjunction with the means 22 for comparing the counted pulses can include a means 60 for monitoring the apparatus 10 to indicate that the apparatus 10 is misaligned. This is preferably accomplished by making a comparison between the total number of pulses counted at the end of each full run of the door 12 to the total number of pulses counted during the initialization. If the two totals are the same, then the door movement with respect to the rotation of the drive shaft 28 has not changed. However, if the totals are different, then there has been a change in the relationship between the drive shaft 28 and the door movement, for example, a mechanical gear or linkage may be worn or slippage of the belt drive may have occurred. When such a difference is detected by the monitoring means 60, a signal, for example, either electronic, audio, visual, or a combination thereof can be generated.

Although the present invention has been discussed and described herein with respect to one or more specific embodiments it will be understood that other arrangements or configurations can also be made that do not depart from the spirit and scope hereof. Hence, the present invention is deemed limited only by the claims appended hereto and the reasonable interpretation thereof.

What is claimed is:

1. A method of controlling an elevator door, said method comprising the steps of:

moving an elevator door from one extreme position to the other extreme position;

storing the phase/direction information resulting from said moving step in a memory associated with a microprocessor;

moving said elevator door from one extreme position to the other extreme position at a constant preselected speed while counting pulses generated by an incremental encoder and simultaneously measuring the elapsed time between said extreme positions such that a reference speed is determined; and normalizing said number of pulses counted to represent 100% of the distance travelled by said elevator door between said extreme positions.

2. The method as claimed in claim 1 further including the step of:

controlling the speed of said elevator door by issuing control signals at preselected control points along a speed versus distance profile map for said elevator door.

3. The method as claimed in claim 2 further including the step of representing said control points as a percentage of the total distance travelled by said elevator door such that said control signals are issued in accordance with the number of pulses counted.

\* \* \* \* \*